United States Patent [19]

Hickman

[11] Patent Number: 5,290,739
[45] Date of Patent: Mar. 1, 1994

[54] HIGH TEMPERATURE STABILIZED MULLITE-ALUMINUM TITANATE

[75] Inventor: David L. Hickman, Big Flats, N.Y.
[73] Assignee: Corning Incorporated, Corning, N.Y.
[21] Appl. No.: 949,454
[22] Filed: Sep. 22, 1992
[51] Int. Cl.$^5$ .............................................. C04B 35/10
[52] U.S. Cl. ..................................... 501/128; 501/134
[58] Field of Search ................ 501/127, 128, 134, 153

[56] References Cited

U.S. PATENT DOCUMENTS

| | | | |
|---|---|---|---|
| 2,776,896 | 1/1957 | Harman et al. | 501/134 |
| 4,483,944 | 11/1984 | Day et al. | 502/439 |
| 4,855,265 | 8/1989 | Day et al. | 501/128 |
| 4,915,887 | 4/1990 | Day et al. | 264/56 |
| 5,055,435 | 10/1991 | Hamanaka et al. | 501/134 |
| 5,153,153 | 10/1992 | Freudenberg | 501/127 |

Primary Examiner—Mark L. Bell
Assistant Examiner—A. Wright
Attorney, Agent, or Firm—Angela N. Nwaneri

[57] ABSTRACT

This invention relates to a sintered mullite-aluminum titanate article formed by doping the mullite with 1-5% titania and/or titania precursors, and 1-5% hematite and/or hematite precursors, pre-calcining the mullite and mixing with calcined aluminum titanate to form a mullite-aluminum titanate composition which may be formed into a high temperature stabilized ceramic article such as a honeycomb.

9 Claims, 3 Drawing Sheets

HIGH TEMPERATURE STABILIZED MULLITE-ALUMINUM TITANATE

BACKGROUND OF THE INVENTION

This invention relates to high temperature stabilized mullite aluminum titanate compositions formed by doping and pre-calcining the mullite with titania and hematite, and mixing the doped, pre-calcined mullite with pre-calcined aluminum titanate. Aluminum titanate is used in applications where thermal shock and ultimate use temperatures are high, as well as for diesel particulate filters and catalytic converters. Typically, aluminum titanate is desirable in harsh thermal environments requiring high thermal shock resistance, low thermal expansion, and high mechanical strength. Like most ceramic compositions, it has long been recognized that when aluminum titanate is subjected to such thermally harsh environments, the crystalline phases of the ceramic matrix are reordered, thus impairing the desirable thermal and mechanical properties of the ceramic article. In particular, at temperatures of 800°–1300° C., aluminum titanate tends to decompose to its titania and alumina precursors.

Many approaches have been suggested for stabilizing aluminum titanate against decomposition at high temperatures. For example, it has been suggested that the addition of rare earth oxides and iron oxides to aluminum titanate and aluminum titanate mullite compositions will stabilize the aluminum titanate against decomposition. A major disadvantage of the above approach is that such additives tend to adversely affect the thermal and mechanical properties of the ceramic composition.

More recently, it has been suggested that aluminum titanate can be stabilized at high temperatures by partial substitution of iron for aluminum. For example, it has been suggested in U.S. Pat. No. 4,855,265 that the addition of rare earth oxides and mullite to aluminum titanate will improve the mechanical strength of the ceramic without interfering with the thermal properties of mullite aluminum titanate compositions. This reference discloses that the addition of mullite formers to pre-calcined aluminum titanate grains produces a composite material consisting essentially of a mixture of aluminum titanate and mullite grains which exhibits good mechanical strength, thermal shock resistance and durability. A major problem with the high temperature stabilized aluminum titanate compositions of the prior art is that structures formed with these compositions tend to be especially prone to cracking during the firing process.

It is therefore, the primary objective of the present invention to develop a sintered aluminum titanate article which exhibits good mechanical strength, durability and thermal shock resistance at high temperatures, and which will not crack during firing.

It is also an object of the present invention to develop a method by which large samples of mullite-aluminum titanate can be made to withstand faster firing rates than had previously been possible.

SUMMARY OF THE INVENTION

Briefly, the present invention provides a crack-free, sintered ceramic article produced by (1) pre-reacting or doping mullite with titania, hematite (iron oxide) and/or the precursors of these metal oxides; (2) calcining the doped mullite; (3) calcining aluminum-titanate; (4) mixing the calcined, doped mullite and the aluminum-titanate with a binder to form a ceramic batch, which can be optionally shaped, to form a green ceramic article; and (5) firing the green ceramic article at a temperature and for a duration of time sufficient to form the sintered ceramic article.

A key aspect of the present invention is the discovery that by doping the mullite with titania and hematite and pre-calcining the doped mullite before mixing with aluminum titanate, the high temperature growth and cracking observed in prior compositions can be prevented.

In another aspect, the present invention provides a method of forming green mullite aluminum titanate articles which can withstand faster firing or sintering rates than previously possible, without cracking.

As used in this specification:

"aluminum titanate solid solution" refers generally to aluminum titanate containing crystals, including any aluminum titanate phase which contain some level of $Fe_2TiO_5$ along with the predominant $Al_2TiO_5$.

DETAILED DESCRIPTION OF THE INVENTION

Figure 1:
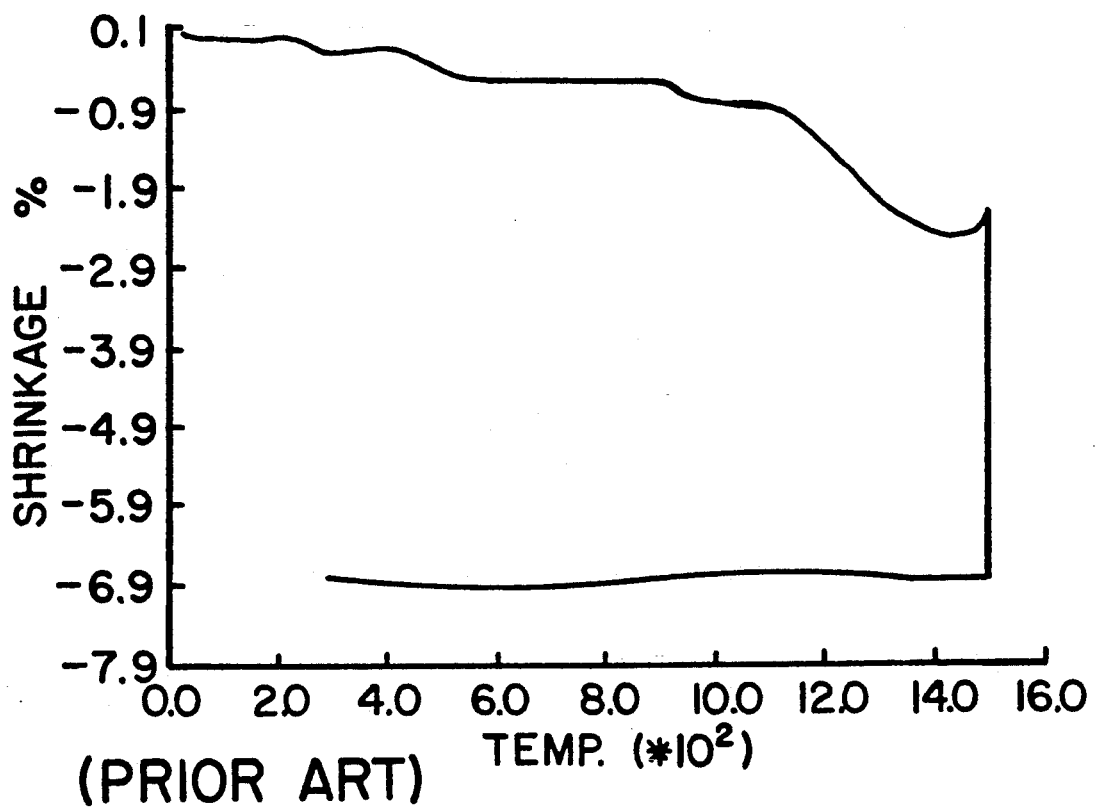
FIG. 1 is a comparative dilatometric diagram of the mullite aluminum titanate of the prior art showing phase growth in the temperature range of about 1250° to 1420° C., as indicated by the peak begining at about 1400° C., and the inflection point at about 1250° C.

I have discovered that aluminum titanate can be stabilized at high temperatures, without the formation of cracks, by mixing pre-calcined aluminum titanate with mullite which has been prereacted or doped with titania, hematite and/or their precursors, and pre-calcined prior to mixing with the aluminum titanate.

The sintered ceramic article of the invention consists essentially, expressed in weight percent based on the oxides, of 1.5–20%, preferably 5–15% $SiO_2$; 5–25%, preferably 5–15% $Fe_2O_3$; 35–75%, preferably 35–60% $Al_2O_3$; and 10–40%, preferably 20–40% $TiO_2$. In a more preferred embodiment, the sintered article consists essentially, expressed by weight percent based on the oxides, of 11.3% $SiO_2$, 9.0% $Fe_2O_3$, 47.7% $Al_2O_3$, and 32.0% $TiO_2$. In addition, the present inventive methods can be applied to prior art mullite aluminum titanate compositions containing other additives, for example, rare earth metal oxides ($RE_2O_3$), and which are known to exhibit grain boundary and intercrystalline microcracking, such as disclosed in co-assigned U.S. Pat. No. 4,855,265, herein incorporated by reference. Thus, the present inventive method of doping and pre-calcining mullite, can be applied to a composition consisting essentially, expressed in weight percent based on the oxides, of 1.5–20% $SiO_2$, 5–25% $Fe_2O_3$, 35–75% $Al_2O_3$, 10–40% $TiO_2$, and 0.1–5% rare earth metal oxides ($RE_2O_3$) selected from the group consisting of La, Ce, Pr, Nd, Sm, Eu, Gd, Tb, Dy, Er, Yb, Y, Sc and mixtures thereof. However, a key aspect of the present invention is the discovery that high temperature stabilized mullite aluminum titanate articles can be formed witout the addition of additives such as rare earth oxides which may adversely affect the thermal properties of such articles.

According to the present invention, the mullite is prepared by prereacting or doping mullite ($3Al_2O_3 \cdot 2SiO_2$) with titania, hematite and/or their precursors such as, their salts, including their nitrates, phosphates, ammonium salts and organometallics such as organo titanates. The doping is accomplished by adding 1–5 wt. %, preferably, 2–4 wt. %, more preferably, 3 wt. percent (based on the oxides) each of titania and hematite to 53.3% standard kaolinite clay such as Hydrite MP Kaolin (available from Dry Branch Kaolin), and 40.8% alumina such as C-701 Alumina (available from Alcan). The mullite (i.e., the doped clay and alumina) is then combined with water and organic binder such as methylcellulose to form an agglomerate of the mullite which can then be extruded into spaghetti strands and fired. In one particularly useful embodiment, the strands were calcined or fired at 1500° C. for about 10 hours to form essentially a single phase of $3Al_2O_3.2SiO_2$ (mullite). The doped, pre-calcined mullite is then ground by ball milling to a desired mean particle size, and mixed with calcined aluminum titanate to form the mullite-aluminum titanate of the invention, having, expressed in terms of volume percent, essentially about 25–95% of aluminum titanate solid solution crystals, and 5–75% of mullite crystals.

Useful aluminum titanates for the invention include aluminum titanate which has been stabilized with iron and/or rare earth oxides as disclosed in co-assigned U.S. Pat. No. 4,855,265, herein incorporated by reference. The iron stabilized aluminum titanate is prepared essentially by mixing 37 weight percent of $Al_2O_3$ with $Fe_2O_3$ (a pigment grade hematite), and $TiO_2$. The material is combined with water and an organic binder such as methylcellulose to form agglomerates of the mixture. The agglomerated mixture is then air-dried for 24 hours and fired at 1400° C. for about 6 hours to form essentially a single phase solid solution of $Al_2TiO_5$-containing crystals. Because of the ready reaction of $Fe_2O_3$ with $TiO_2$, at least a portion of the aluminum titanate phase present in the composition may consist of a solid solution containing $Fe_2TiO_5$. Good results were also obtained by firing the agglomerated mixture at 1500°0 C. for 10 hours.

In a preferred embodiment, iron-stabilized aluminum titanate is used, that is, aluminum titanate in which about 15 to 25 mole percent, (preferably, 20 mole percent), of the aluminum in the aluminum titanate has been replaced with iron. Thus, the preferred sintered ceramic article contains essentially two crystal phases, an iron-aluminum titanate solid solution and a mullite crystal phase. The content of aluminum titanate solid solution crystals in the inventive composition ranges from 25–95%, preferably, 50–80%, and that the content of the mullite crystals ranges from about 5–75%, preferably, 20–50%.

For particularly useful results, prior to mixing, the doped, pre-calcined mullite and the pre-calcined aluminum titanate agglomerates can be milled to a particle size suitable for the given application. For example, if the ceramic batch is to be shaped into a cellular structure such as a honeycomb, it is preferable that the pre-calcined mullite and aluminum titanate agglomerates be ground by ball milling to a mean particle size of less than 149 microns, more preferably to about 5 to 100 microns. For best results, the agglomerates are milled to a median particle size of approximately 40 microns. In one embodiment in which the ceramic batch is shaped into a honeycomb structure, the pre-calcined mullite and pre-calcined aluminum titanate agglomerates were milled to a mean particle size of about 20 microns ($2 \times 10^{-3}$ cm), and screened to about $-200$ mesh ($6 \times 10^{-3}$ cm), prior to mixing with the binder. The mixture is then plasticized and formed into the desired shape or article (e.g., a honeycomb), using known forming methods such as, for example, extrusion. The shaped article is then dried to remove water and subsequently fired or sintered in a temperature range of about 1400°–1650° C.

Using shrinkage dilatometry, a technique which measures the shrinkage of a material as it is fired, the formation of cracks during firing was studied to determine the temperature at which dimensional changes occurred. Using a high temperature dilatometer, shrinkage of the samples was continuously monitored during firing to 1500° C. and subsequent cooling. It was determined that the mullite-aluminum titanate of the prior art undergoes growth at about 1250°–1420° C., followed by precipitous shrinkage as shown in FIG. 1. While not intending to be bound by theory, it is believed that this growth may be at least partly responsible for the cracks observed in the articles during sintering. In subsequent experiments discussed below, the growth observed in prior art ceramic articles were found to be independent of firing rates.

Figure 2:
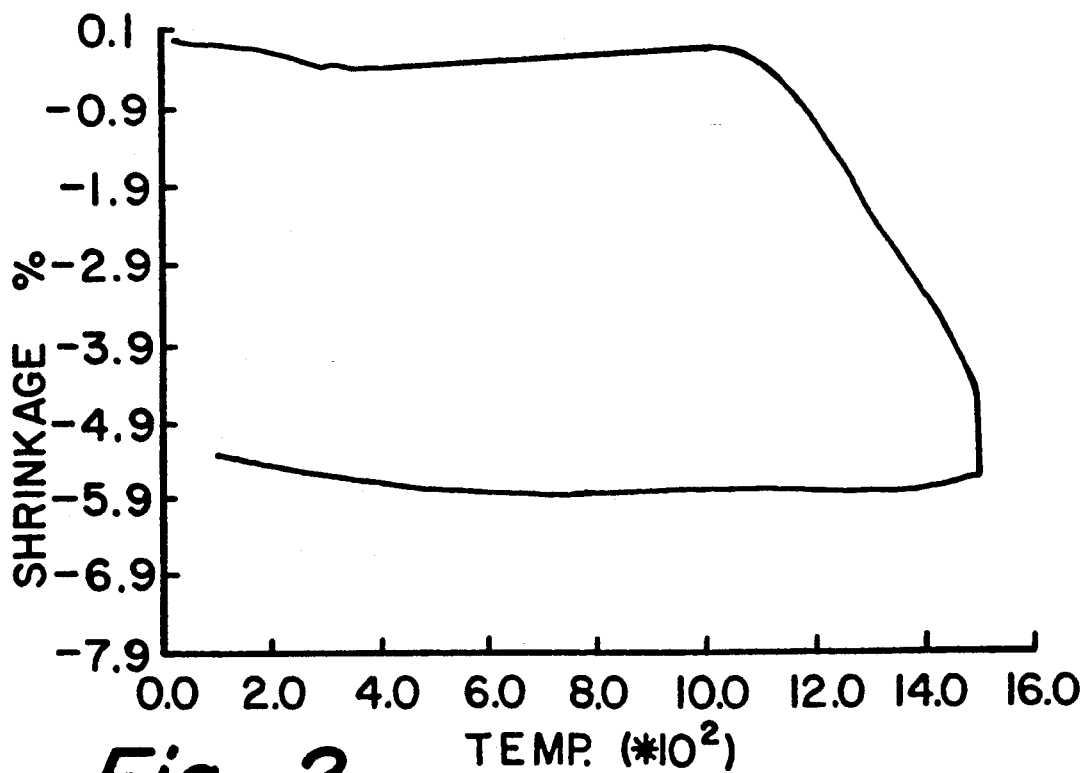
FIG. 2 is a shrinkage dilatometric diagram showing the shrinkage of aluminum titanate during sintering.
Figure 3:
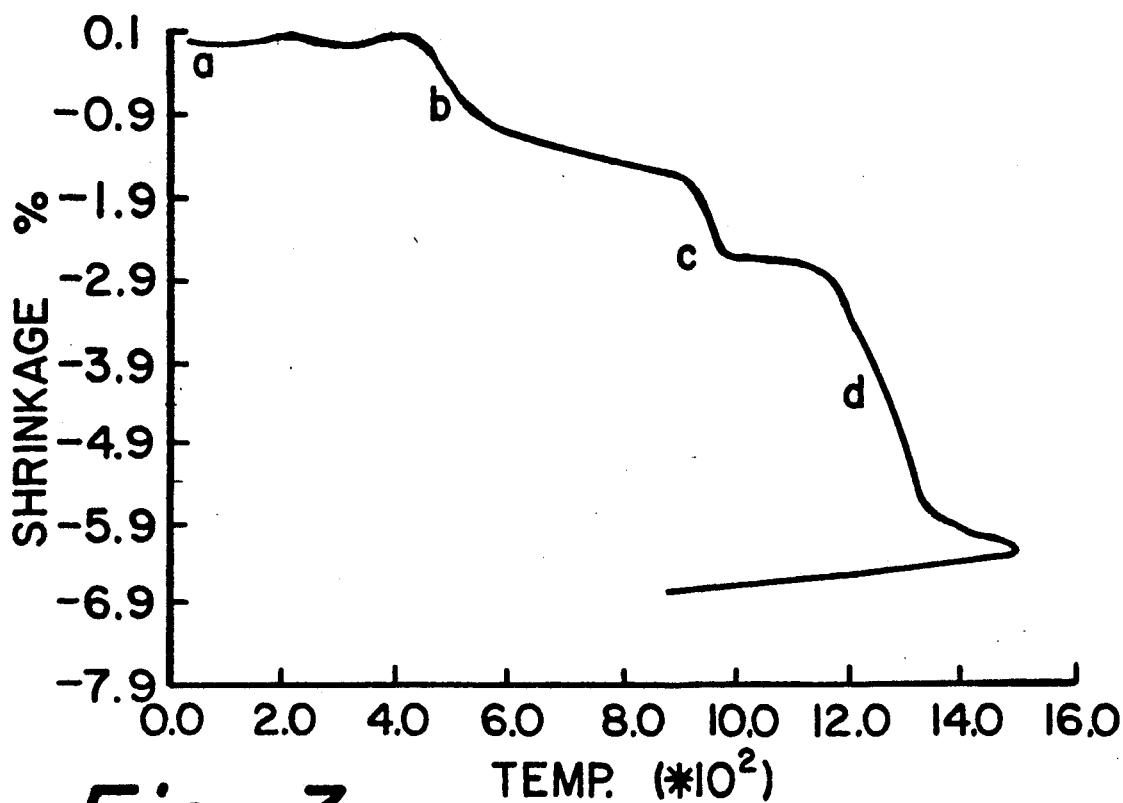
FIG. 3 is a dilatometric diagram showing the shrinkage of mullite during sintering.
Figure 4:
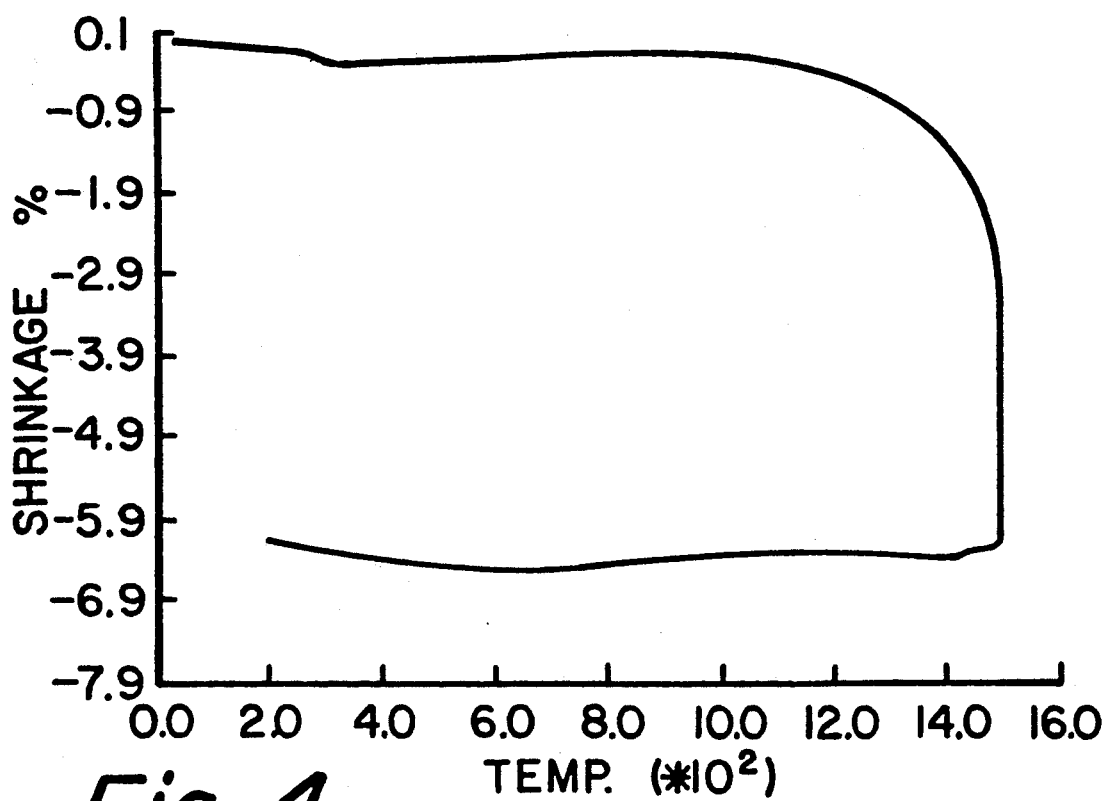
FIG. 4 is a dilatometric diagram of the mullite aluminum titanate of the present invention showing absence of the high temperature growth of FIG. 1.

As shown in FIGS. 2 and 3, no similar growth was observed when aluminum titanate (FIG. 2) and mullite (FIG. 3) were each fired separately to 1500° C. However, when the two materials are combined as shown in FIG. 1, growth was observed in the temperature range of about 1250° to 1420° C. In contrast, when the mullite aluminum titanate of the present invention is fired using the same schedule (that is, to 1500° C. at the same rate), no growth was observed as shown by FIG. 4. In FIG. 3, the regions marked (a)–(d) depict areas of binder burnout, clay dehydration, mullite seed formation, and sintering respectively.

It has not been conclusively determined what causes growth in this region of the firing schedule, however, it is being theorized that such growth is caused by hematite, titania, and possibly aluminum titanate migrating into the mullite phase at elevated temperatures. It is known that both hematite and titania form solid solutions in mullite, both species having a solubility of about 3% in mullite at high temperatures (1500° C.). It is also known that at lower temperatures (about 1200° C.), hematite has a solubility of about 10% in mullite. Aluminum titanate is further known to be about 10% less dense than the alumina and titania constituents from which aluminum titanate is formed. Therefore, it is theorized that if there is excess titania in the aluminum titanate or if titania exsolves from the aluminum titanate phase into the mullite phase, this could result in the formation of aluminum titanate in the mullite phase. It is believed that the growth which is observed at high temperature, in mullite-aluminum titanate, is due to the formation of a solid solution of hematite and titania in the mullite phase, with each component increasing the mullite crystal cell size by about 0.5–0.7%. It is also believed that this growth formation is at least partly responsible for the formation of cracks in mullite-aluminum titanate compositions of the prior art.

Figure 5:
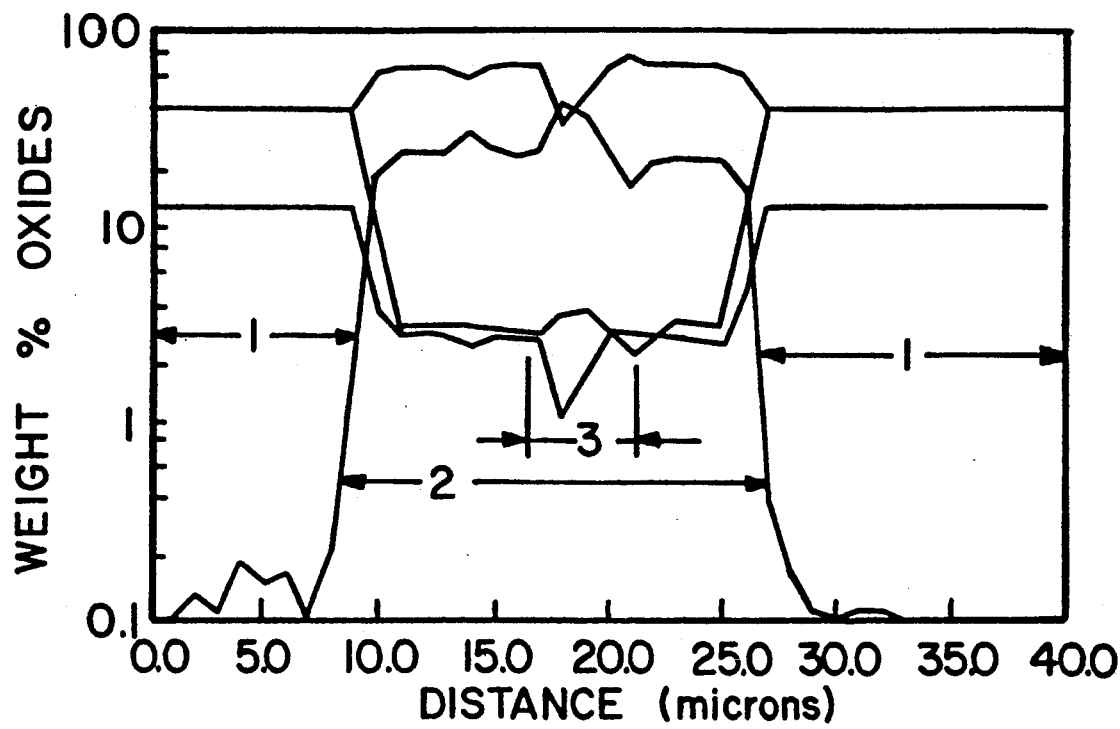
FIG. 5 is a diagram showing the presence and composition of a third phase in the mullite phase of the prior art composition.

Using shrinkage dilatometry, x-ray analyses, and electron microscopy, the concentration of hematite and titanium in the different phases of the sintered article was measured and the shrinkage results were correlated to the observed microstructural change. It was determined from an electron microprobe of prior art mullite aluminum titanate that the hematite and titania migrated out of the aluminum titanate phase, and into the mullite phase, producing mullite having about 3% each of titania and hematite as shown in FIG. 5, which is a scanning electron micrograph (SEM) taken in 1 micron steps across a double interface of $Al_2O_3$—$(3Al_2O_3.2SiO_2)$—$Al_2O_3$, of the mullite-aluminum titanate of the prior art.

Even though hematite has a solubility of about 10% in mullite at 1200° C., no high levels of hematite were observed in the mullite phase. In FIG. 5, the two regions marked (1) represent the aluminum titanate phase, the region marked (2) represents the mullite phase. It was discovered that in addition to the predominant mullite and aluminum titanate phases of the prior art mullite-aluminum titanate composition, there is also present in the mullite phase, a third phase marked (3) in FIG. 5. As shown in FIG. 5, this phase is higher in silica and lower in alumina than the surrounding mullite phase. This phase is also higher in titania and lower in hematite than the predominant mullite phase. The effect, if any, of this phase on the properties of the sintered ceramic structure of the prior art is not well understood. However, it is theorized that it may be at least partially responsible for the growth and cracks observed in the mullite aluminum titanate articles of the prior art.

EXAMPLES

1. Ceramic Batch of the Invention:

In the following examples, the ceramic article was prepared by adding 3% each of titania and hematite to mullite of the following composition: 53.3% kaolinite clay, and 40.8% alumina. The mixture was extruded into spaghetti shaped strands and fired for 10 hours at 1500° C. The doped mullite was then milled to a mean particle size of 20 microns and screened to −200 mesh (60 microns). The milled, doped mullite was then added to pre-calcined aluminum titanate of which 20 mole percent of the aluminum has been replaced with iron. The mixture was then mixed with plasticizer to form a mullite-aluminum titanate batch composition having about 42.2% mullite and 57.8% aluminum titanate.

2. Firing:

In one set of experiments, the mullite-aluminum titanate batch material was extruded into 0.6" (1.5 cm) rods using a ⅜" (0.95 cm) diameter circular die. The rods were dried at 100° C. in glass tubes to avoid cracking. As indicated by the shrinkage dilatometry of this material (FIG. 4), no growth was observed at elevated temperatures. No cracks were observed in any of the cut samples indicating that the high temperature growths had been eliminated.

In another set of experiments, the effect of firing rates on the formation of growth and/or cracks was also studied. Here, the ceramic batch was extruded to several green honeycomb structures measuring 4-3/16 " (10.6 cm) diameter and 4" (10.2 cm) length and fired. Three samples were fired to 1500° C. in 22, 10 and 15 hours respectively. Two samples were fired to 1480° C. in 9 and 5.7 hours respectively. After firing, the samples were cut every 0.75" (1.9 cm) in the direction perpendicular to the extrusion direction, and examined for cracks. No cracks were observed in any of the samples.

3. Comparative Ceramic Batch (Prior Art):

In several comparative examples, ceramic articles were prepared using prior art methods, that is, using undoped, uncalcined mullite. Three such samples were fired using different firing rates. The first sample was fired to 1500° C. in about 15 hours (FIG. 1). The second sample was fired to 1490° C. in about 107 hours, while the third sample was fired to 1470° C. in about 61 hours. Cracking was observed in all three samples.

Figure 6:
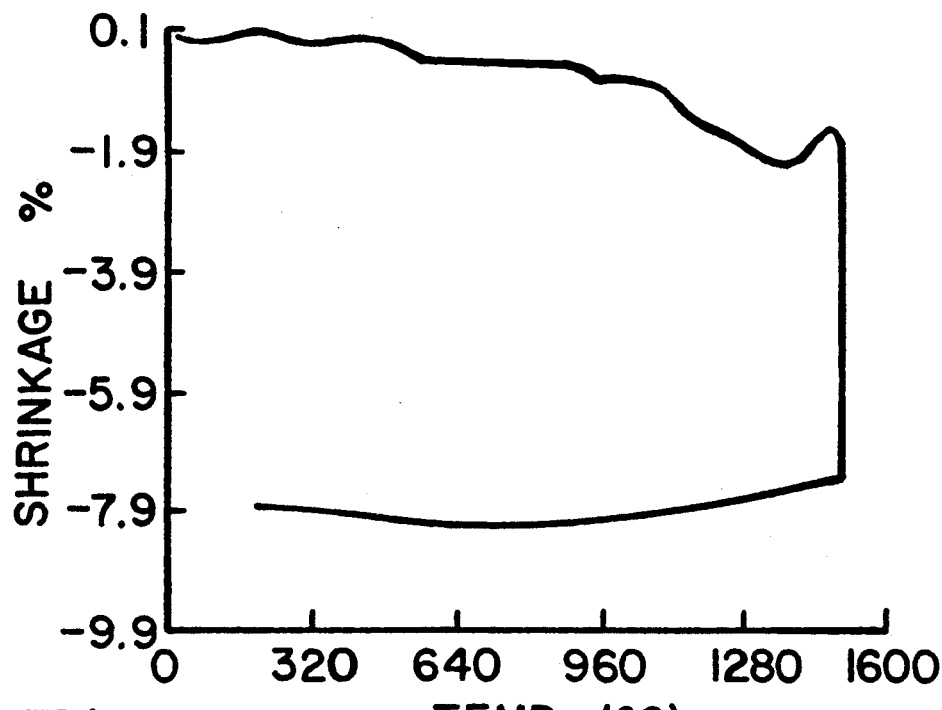
FIG. 6 is a shrinkage dilatometric diagram of mullite aluminum titanate prepared from doped but uncalcined mullite, showing phase growth in the temperature range of about 1300° to 1500° C.

4. Effect of Pre-calcining the Mullite:

To determine the effect of pre-calcining the doped mullite of the invention, the mullite was doped (but not pre-calcined), and combined with aluminum titanate. As shown by FIG. 6, growth similar to that observed in the prior art, was observed in the temperature range of about 1300° to 1500° C. As shown in FIG. 4, no growth is seen when the mullite is doped and pre-calcined before combining with aluminum titanate. From these experiments, it was concluded that pre-calcining of the mullite has a high temperature stabilizing effect on mullite-aluminum titanate.

In addition to the embodiments discussed above, it should be understood that given the teachings herein, numerous alternatives and equivalents which do not depart from the present invention will be apparent to those skilled in the art, and are intended to be included within the scope of the present invention. It should also be understood that this invention is not to be unduly limited to the illustrative embodiments set forth herein.

What is claimed is:

1. A method of producing a high temperature stabilized mullite-aluminum-titanate article, the article consisting essentially, expressed in weight percent based on the oxides, of 1.5–20%, $SiO_2$, 5–25% $Fe_2O_3$, 35–75% $Al_2O_3$, and 10–40% $TiO_2$, said method comprising the steps of:

forming doped mullite by a process selected from: (1) doping mullite with dopant selected from titania, titania precursors, hematite, and hematite precursors to form doped mullite; and (2) pre-reacting mullite precursors with dopant selected from titania, titania precursors, hematite, and hematite precursors to form doped mullite precursors;

calcining and milling the doped mullite;

calcining and milling aluminum-titanate;

mixing the mullite and the aluminum-titanate with a binder to form a ceramic batch;

shaping the ceramic batch to form a green ceramic article; and firing the green ceramic article at a temperature and for a duration of time sufficient to form the sintered ceramic article.

2. The method of claim 1, wherein the sintered ceramic article comprises iron aluminum titanate solid solution and mullite as the two predominant crystal phases.

3. The method of claim 1, wherein prior to mixing the doped and calcined mullite and the calcined aluminum titanate with a binder to form the ceramic batch, mullite and the aluminum titanate are milled to a mean particle size of 20 microns.

4. The method of claim 1, wherein 15-25 mole percent of aluminum in the aluminum titanate has been replaced with iron.

5. The method of claim 4, wherein 20 mole percent of the aluminum in the aluminum titanate has been replaced with iron.

6. The method of claim 1, wherein the ceramic article is fired at a temperature in the range of 1400° to 1500° C., for a duration in the range of 5 to 25 hours.

7. A method of producing a sintered ceramic body consisting essentially of the composition expressed in terms of weight percent based on the oxides, of 1.5-20% $SiO_2$, >5-25% $Fe_2O_3$, 35-75% $Al_2O_3$, 10-40% $TiO_2$, and 0.1-5% $RE_2O_3$, the steps comprising:

(a) calcining a mixture of $Fe_2O_3$, $TiO_2$ and $Al_2O_3$ to a single phase solid solution;
(b) grinding the solid solution to a powder;
(c) mixing mullite with the powder to from a homogeneous body;
(d) combining rare earth metal oxides either to the mixture prior to the calcining step or to the powder in the mixing step; and
(e) firing the body to form the sintered ceramic body; the improvement being that prior to mixing the mullite with the powder to form a homogeneous body, the mullite is first (1) doped with dopant selected from titania, titania precursors, hematite, and hematite precursors to form doped mullite precursors, and (2) calcined.

8. A method of producing a sintered ceramic body consisting essentially of the composition expressed in terms of weight percent based on the oxides, of 1.5-20% $SiO_2$, 5-25% $Fe_2O_3$, 35-75% $Al_2O_3$, and 10-40% $TiO_2$, the steps comprising:

(a) calcining a mixture of $TiO_2$ and $Al_2O_3$ to a single phase solid solution;
(b) grinding the solid solution to a powder;
(c) doping mullite with hematite;
(d) calcining the doped mullite;
(e) mixing the doped mullite with the powder to form a homogeneous body; and
(f) firing the body to form the sintered ceramic body.

9. The method of claim 8, wherein the mullite comprises mullite precursors.

* * * * *